United States Patent
Song et al.

(10) Patent No.: US 8,312,457 B2
(45) Date of Patent: Nov. 13, 2012

(54) MAINTAINING A COUNT FOR LOCK-FREE LINKED LIST STRUCTURES

(75) Inventors: Chunyan Song, Bellevue, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 12/637,535

(22) Filed: Dec. 14, 2009

(65) Prior Publication Data

US 2011/0145827 A1 Jun. 16, 2011

(51) Int. Cl.
*G06F 9/46* (2006.01)
*G06F 13/00* (2006.01)
*G06F 7/00* (2006.01)

(52) U.S. Cl. ........ 718/100; 711/147; 711/154; 711/168; 719/314; 707/799; 707/800

(58) Field of Classification Search .................. None
See application file for complete search history.

(56) References Cited

U.S. PATENT DOCUMENTS

| | | | |
|---|---|---|---|
| 6,826,757 B2 | 11/2004 | Steele | |
| 6,973,467 B1 * | 12/2005 | Furusho | 707/700 |
| 7,117,502 B1 | 10/2006 | Harris | |
| 7,293,143 B1 * | 11/2007 | Shavit et al. | 711/147 |
| 7,451,146 B2 | 11/2008 | Boehm | |
| 7,724,956 B2 * | 5/2010 | Walch | 382/186 |
| 7,774,374 B1 * | 8/2010 | Kizhepat et al. | 707/800 |
| 2003/0061597 A1 * | 3/2003 | Curtis et al. | 717/128 |
| 2005/0204103 A1 * | 9/2005 | Dennison | 711/154 |
| 2009/0177859 A1 * | 7/2009 | Todd et al. | 711/170 |
| 2009/0313418 A1 * | 12/2009 | Ross | 711/103 |

OTHER PUBLICATIONS

Groves, Lindsay, et al., "Derivation of a Scalable Lock-Free Stack Algorithm", Electronic Notes in Theoretical Computer Science 187 (2007), 55-74.
Hendler, Danny, et al., "A Scalable Lock-free Stack Algorithm", SPAA'04, Jun. 27-30, 2004, pp. 206-215.
Moir, Mark, et al., "Concurrent Data Structures", 2001, 32 pages.
Michael, Maged M., et al., "Nonblocking Algorithms and Preemption-Safe Locking on Multiprogrammed Shared Memory Multiprocessors", Jan. 10, 1998, 26 pages.
Vafeiadis, Viktor, "Proving linearisability of lock-free algorithms", Based on information and belief available, at least as early as Nov. 26, 2009, 6 pages.

* cited by examiner

*Primary Examiner* — Meng An
*Assistant Examiner* — Abdullah Al Kawsar
(74) *Attorney, Agent, or Firm* — Workman Nydegger

(57) ABSTRACT

The present invention extends to methods, systems, and computer program products for maintaining a count for lock-free stack access. A numeric value representative of the total count of nodes in a linked list is maintained at the head node for the linked list. Commands for pushing and popping nodes appropriately update the total count at a new head node when nodes are added to and removed from the linked list. Thus, determining the count of nodes in a linked list is an order 1 (or O(1)) operation, and remains constant even when the size of a linked list changes.

13 Claims, 9 Drawing Sheets

MAINTAINING A COUNT FOR LOCK-FREE LINKED LIST STRUCTURES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In a computing environment, it is not uncommon to use data structures, such as, for example, stacks and queues, to represent collections of data items. In parallel processing systems, multiple concurrently executing threads can access a data structure to add, change, and/or remove data items from a collection. However, in a parallel processing environment, a thread must typically obtain a lock on the data structure to operate on the data structure in a thread safe manner.

In many collection types (e.g., non-thread-safe types, or types that achieve thread-safety by using a lock), the count of the number of elements in the collection is stored in one place and is updated any time an item is added or removed. A count method can then return this stored count, rather than iterating through the collection. However, this approach becomes increasing complicated when using lock-free algorithms. As such, a common solution when using lock free algorithms is to iterate through a collection to obtain the count.

Iterating over a collection is typically order N (or O(N)). That is, the time to complete the count method increases proportionally to the size of the stack. A common pattern for using a count method is to include the count method in a loop for repeated use. Thus, for lock-free algorithms, overall processing time can increase substantially due to repeated execution of an O(N) count method and/or as the number of items in a collection increases.

BRIEF SUMMARY

The present invention extends to methods, systems, and computer program products for maintaining a count for lock-free linked list access. Embodiments of the invention include adding and removing nodes from a linked list while maintaining the count of items contained in the linked list at a head node of the linked list. Each node in the link list includes a next pointer field and an index field. The next pointer field stores a next pointer value pointing to the next node following the node in the linked list. The index field stores an index value used to calculate how many nodes are included in the linked list.

In some embodiments, a node is added to a link list. An indication is received from a concurrently executing thread indicating that a new node is to be added to a linked list. A head pointer is used to access a current head node of the linked list. An index value is accessed from an index of the current head node. The index value is a numeric value representative of the current number of nodes in the linked list. The index value is incremented to generate an updated index value.

The updated index value is stored in the index value field of the new node. The updated index value is a numeric value representative of the current number of nodes in the linked list including the new node. A pointer from the new node to the current head node is stored within a pointer field of the new node. The head pointer is updated to point to the new node thereby making the new node the head node for the linked list. Accordingly, the number nodes contained in the linked list remains accessible via the head pointer.

In other embodiments, a range of nodes is added to a linked list. The number of nodes included in the range of nodes is determined. The index value is set to a decrementing value (e.g., −1) for all nodes in the range nodes with the exception of the first node in the range of nodes (representing that the index value is one less than the index value of the next node to be subsequently added to the linked list). The number of nodes in the range of nodes is added to the index value from the head node to calculate an updated index value. The updated index value is stored in the index value field of the first node in the range of nodes. The next pointer value for the last node in the range of nodes is adjusted to point to the head node. The head pointer is updated to point to the first node in the range of nodes thereby making the first node the head node for the linked list.

In further embodiments, a node is removed from a linked list. An indication is received from a concurrently executing thread indicating that a node is to be removed from a linked list. A pointer is used to access the index value stored in the index field of a head node of the stack. The next pointer value is used to access the next node following the head node in the linked list. If the index value in the index field of the next node is a decrementing value (e.g., −1), the index value from the head node and the decrementing value are combined to calculate a new index value for the next node. Otherwise, the index value in the index field of the next node is retained. The head pointer is adjusted to point to the next node and the head node is removed from the linked list. Accordingly, the number nodes contained in the linked list remains accessible via the head pointer.

In additional embodiments, a range of nodes is removed from a linked list. The range of nodes includes at least a head node and at least one other node including a last node. A head pointer is used to access an index value from an index value field of the head node. The index value is a numeric value indicating the number of nodes added to the linked list prior to the head node.

For each node in the range of nodes, a next pointer value is used to access an index value from the index field of the next following node in the linked list. If the index value at the next following node is a decrementing value (e.g., −1), the index value from the subsequent node and the decrementing value are combined to calculate a new index value for the next following node. Otherwise, the index value in the index field of the next following node is retained. Thus, the index value for the next node following the last node in the range of nodes is updated to number value representative of the number of nodes added to the linked list prior to the next node following the last node. The head pointer is adjusted to point to the next node following the last node, making the next node following the last node the head node. The range of nodes is then removed from the linked list.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
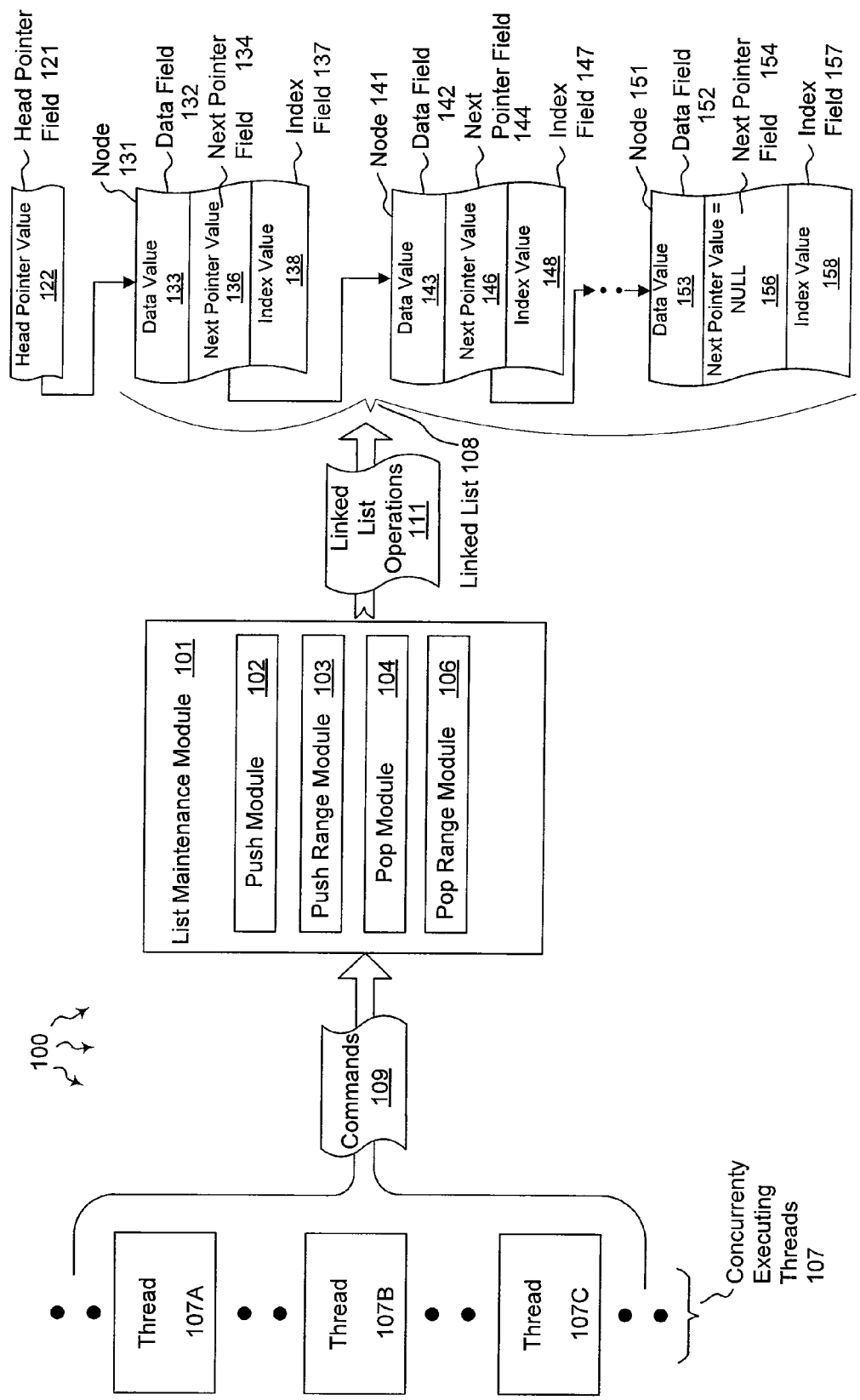
FIG. 1 illustrates an example computer architecture that facilitates maintaining a count for lock-free stack access.

The present invention extends to methods, systems, and computer program products for maintaining a count for lock-free stack access. Embodiments of the invention include adding and removing nodes from a linked list while maintaining the count of items contained in the linked list at a head node of the linked list. Each node in the link list includes a next pointer field and an index field. The next pointer field stores a next pointer value pointing to the next node following the node in the linked list. The index field stores an index value used to calculate how many nodes are included in the linked list.

In some embodiments, a node is added to a link list. An indication is received from a concurrently executing thread indicating that a new node is to be added to a linked list. A head pointer is used to access a current head node of the linked list. An index value is accessed from an index of the current head node. The index value is a numeric value representative of the current number of nodes in the linked list. The index value is incremented to generate an updated index value.

The updated index value is stored in the index value field of the new node. The updated index value is a numeric value representative of the current number of nodes in the linked list including the new node. A pointer from the new node to the current head node is stored within a pointer field of the new node. The head pointer is updated to point to the new node thereby making the new node the head node for the linked list. Accordingly, the number nodes contained in the linked list remains accessible via the head pointer.

In other embodiments, a range of nodes is added to a linked list. The number of nodes included in the range of nodes is determined. The index value is set to a decrementing value (e.g., −1) for all nodes in the range nodes with the exception of the first node in the range of nodes (representing that the index value is one less than the index value of the next node to be subsequently added to the linked list). The number of nodes in the range of nodes is added to the index value from the head node to calculate an updated index value. The updated index value is stored in the index value field of the first node in the range of nodes. The next pointer value for the last node in the range of nodes is adjusted to point to the head node. The head pointer is updated to point to the first node in the range of nodes thereby making the first node the head node for the linked list.

In further embodiments, a node is removed from a linked list. An indication is received from a concurrently executing thread indicating that a node is to be removed from a linked list. A pointer is used to access the index value stored in the index field of a head node of the stack. The next pointer value is used to access the next node following the head node in the linked list. If the index value in the index field of the next node is a decrementing value (e.g., −1), the index value from the head node and the decrementing value are combined to calculate a new index value for the next node. Otherwise, the index value in the index field of the next node is retained. The head pointer is adjusted to point to the next node and the head node is removed from the linked list. Accordingly, the number nodes contained in the linked list remains accessible via the head pointer.

In additional embodiments, a range of nodes is removed from a linked list. The range of nodes includes at least a head node and at least one other node including a last node. A head pointer is used to access an index value from an index value field of the head node. The index value is a numeric value indicating the number of nodes added to the linked list prior to the head node.

For each node in the range of nodes, a next pointer value is used to access an index value from the index field of the next following node in the linked list. If the index value at the next following node is a decrementing value (e.g., −1), the index value from the subsequent node and the decrementing value are combined to calculate a new index value for the next following node. Otherwise, the index value in the index field of the next following node is retained. Thus, the index value for the next node following the last node in the range of nodes is updated to number value representative of the number of nodes added to the linked list prior to the next node following the last node. The head pointer is adjusted to point to the next node following the last node, making the next node following the last node the head node. The range of nodes is then removed from the linked list.

It is possible for a head node to change between the time a count is obtained and the time a command (either adding or removing one or more nodes) is issued to change the head node. When this occurs, the command can be retried using the new head node.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates maintaining a count for lock-free linked list access. Referring to FIG. 1, computer architecture 100 includes concurrently executing threads 107, list maintenance module 101, and linked list 108. Each of the depicted components and data structures can be connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Concurrently executing threads 107 included a plurality of concurrently executing threads including threads 107A, 107B, and 107C. Generally, concurrently executing threads 107 can issue commands (e.g., commands 109) to add, altering, and remove nodes of linked list 108. From time to time, executing threads compete for access to linked list 108. Embodiments of the invention preserve the correctness and atomicity of linked list 108 in a lock-free manner.

Generally, list maintenance module 101 implements the principles of the present invention to preserve the correctness and atomicity of linked list 108 in a lock-free manner. List maintenance module can include a variety of different modules for implementing linked list commands among competing threads. As depicted, list maintenance module 101 includes push module 102, push range module 103, pop module 104, and pop range module 106. In response to receiving commands (e.g., commands 109) from threads in concurrently executing threads 107, modules of list maintenance module 101 can generate appropriate operations (e.g., linked list operations 111) for manipulating linked list 108. Among other things, linked list operations 111 can include adding, modifying, and removing nodes of linked list 108

Generally, a linked list includes a plurality of nodes linked to one another via pointers. A linked list can be used to represent any of a variety of different data structures, such as, for example, last in first out (LIFO) data structures including stacks, and first in first out (FIFO) data structures include queues. Within computer architecture 100, linked list 108 represents a stack. However, embodiments of the invention are also applicable to queues.

Head pointer field 121 stores head pointer value 122 that points to the head (or top) node of linked list 108. List maintenance module 101 can alter head pointer value 122 to point to the head node of linked list 108 when nodes are added to (pushed onto) or removed from (popped off of) linked list 108. As depicted in FIG. 1, head pointer value 122 points to node 131 (the current head node of linked list 108).

Each node in linked list 108 can be data structure including a data field, a next pointer field, and an index field. For example, node 131 includes data field 132, next pointer field 134, and index field 137. Similarly, node 141 includes data field 142, next pointer field 144, and index field 147. Likewise, node 151 includes data field 152, next pointer field 154, and index field 157.

In some embodiments, a node is defined as a class as follows:

```
privateclass Node<T>
{
    internal T m_value;          //Value of the node
    internal Node<T> m_next;     //Pointer to the node below in the stack
    internal int m_index;        //Index value
}
```

Generally, a data field stores a data value of interest to one more executing threads. For example, data field 132 stores data value 133, data field 143 stored data value 142, and data field 152 stored data value 153.

A next pointer field stores a next pointer value pointing to the next following node in linked list 108. For example, next pointer field 136 stores next pointer value 136 pointing to node 141, next pointer field 146 stores next pointer value 146 pointing to the node below node 141 in linked list 108, and next pointer field 155 stores next pointer value 156=NULL, representing that node 151 was the first node in linked list 108.

An index field stores an integer value that can be used to determine the count of nodes included in linked list 108. For example, index field 137 stores index value 138, index field 147 stores index value 148, and index field 157 stores index value 158. Index value 138 can be used to calculate how many nodes are included in linked list 108.

In some embodiments, the index value is zero based. That is, the first node added to linked list 108 has an index value of 0 (zero). For example, index value 158=0 (zero), representing that node 151 was the first node in linked list 108. Thus, the total count of nodes in linked list 108 is equal to the sum of the integer value 138 +1. Since the integer value is stored in the head node (node 131), the total count of nodes in linked list 108 can be calculated without traversing each node in linked list 108.

As nodes are added to and removed from linked list 108, the index value in the index field of the head node changes. List maintenance module 101 insures that the index value in the index field of the head node represents the total count of nodes in linked list 108.

In some embodiments (e.g., when a range of nodes is collectively added to linked list 108) stored index values may be relative to the index values of other nodes. For example, an index value for a node can be decrementing value, such as, for example, −1 (negative one), indicating that the index value for the node is one less than the index value for the node above it in linked list 108. Thus, (e.g., when nodes are removed from linked list 108) a decrementing value can be combined with an index value from above node calculate the total count at the node.

Figure 2A:
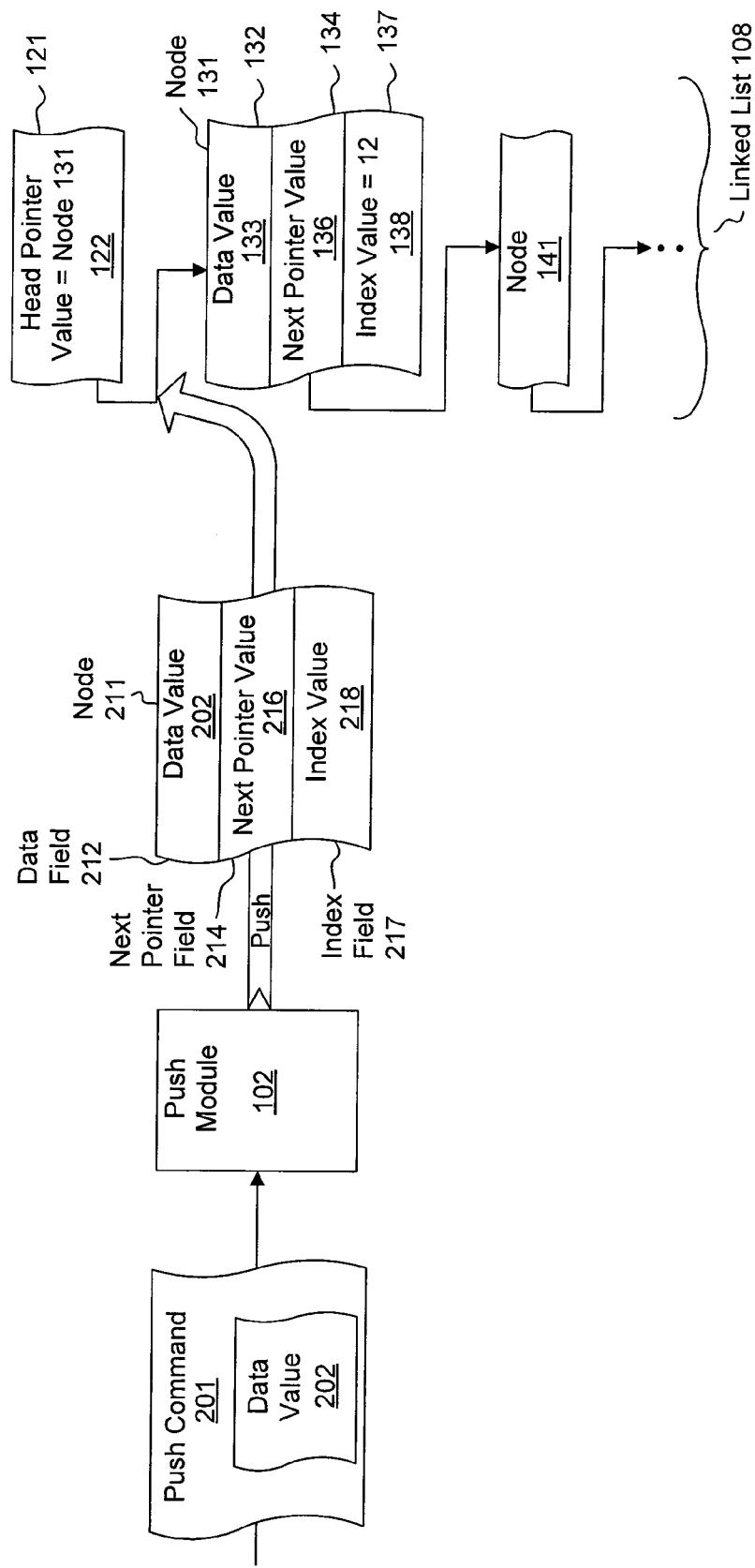
FIGS. 2A and 2B illustrate components and data that facilitate maintaining a count for lock-free stack access when pushing a node onto a stack.
Figure 2B:
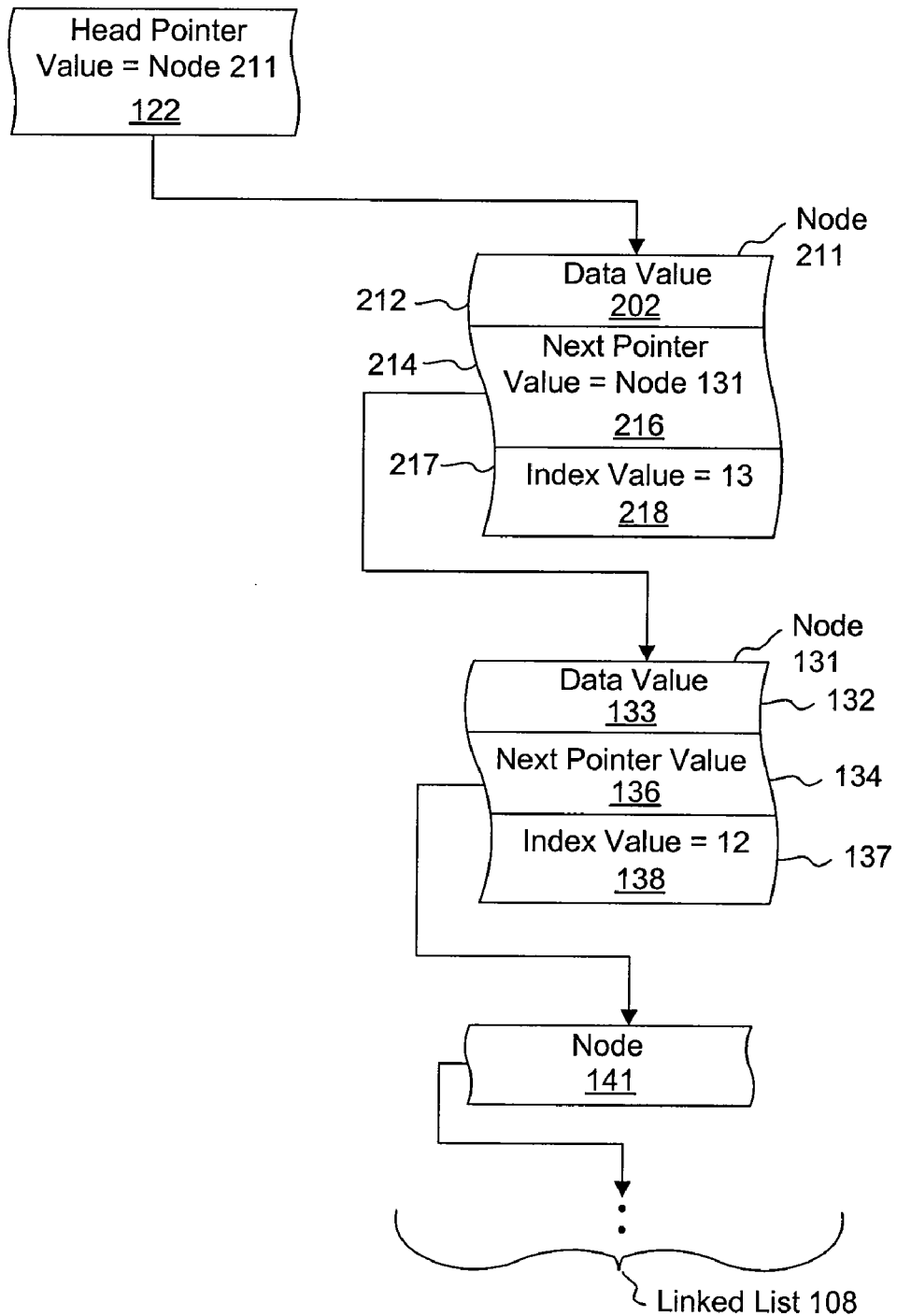

FIGS. 2A and 2B illustrate components and data that facilitate maintaining a count for lock-free stack access when pushing a node onto a stack. As depicted in FIG. 2A, push module 102 receives push command 201, including data value 202, from an executing thread. Pushing a node onto a stack can include creating a new node to store data value 202. For example, in response to receiving push command 201, push module 102 formulates node 211. As depicted, node 211 includes data field 212, next field pointer 214, and index field 217. Data value 202 is stored in data field 212.

Pushing a node onto a stack can also include reading the current head node of the stack. For example, push module 102 can utilize head pointer value 121 to access (read) node 131. Transitioning to FIG. 2B, push module 102 can set next pointer value 216 to point to node 131 and can increment index value 138=12 to set index value 218=13. Push module 102 then attempts to set head pointer value 122 to point to node 211 (and make node 211 the new head node of linked list 108). If changing head pointer value 122 is successful, the operations implementing push command 201 are complete and the resulting configuration of linked list 108 is reflected in FIG. 2B. As depicted, node 211 is the new head node and index value 218 is appropriately set to reflect the count of items in linked list 108.

On the other hand, if changing head pointer value 122 fails, operations for implementing push command 201 are retried. Failure to set head pointer value 122 indicates that another competing thread successfully altered linked list 108 (causing there to be a new head node) prior to push module 102 completing operations to implement push command 201. As such, push module 102 again reads the (new) head node and updates next pointer value 216 and index value 218. Push module 102 then attempts again to set head pointer value 122 to point to node 211. Any number of retries can occur before push module 102 successful implements command 201. Thus, it may be that one or more other nodes are pushed onto linked list 108 prior to successfully pushing node 211 onto linked list 108.

Figure 3A:
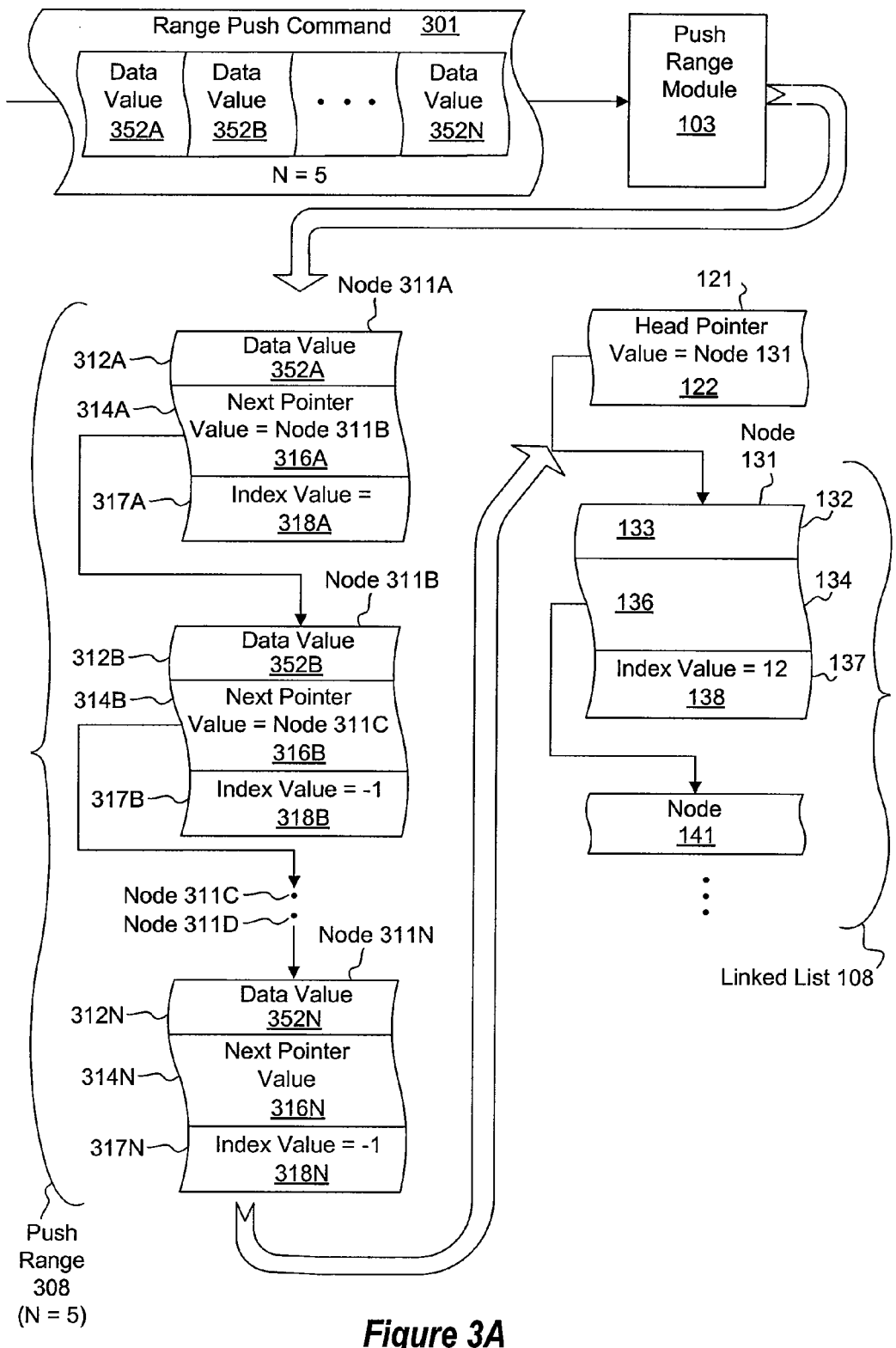
FIGS. 3A and 3B illustrate components and data that facilitate maintaining a count for lock-free stack access when pushing a range of nodes onto a stack.
Figure 3B:
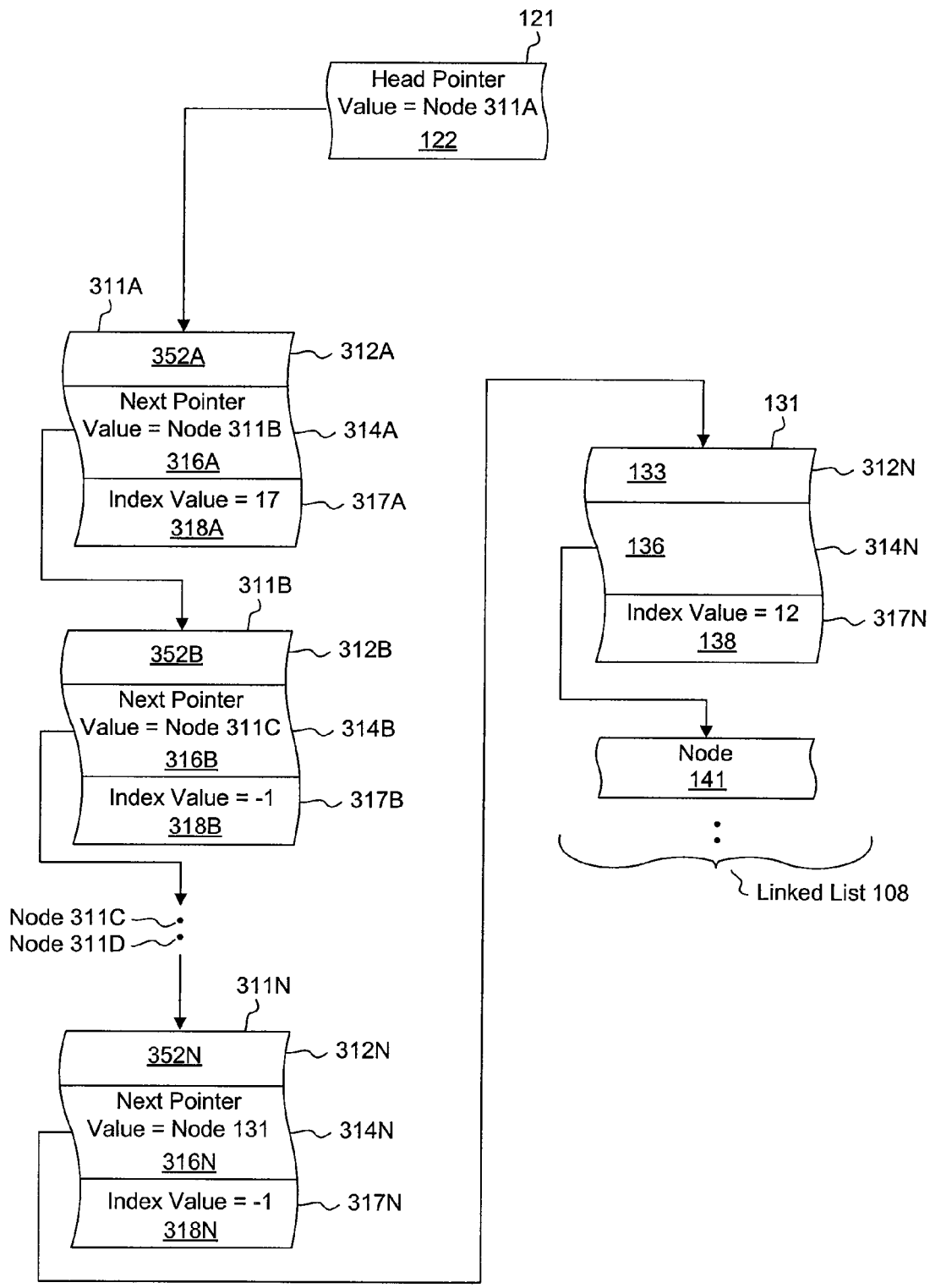

FIGS. 3A and 3B illustrate components and data that facilitate maintaining a count for lock-free stack access when pushing a range of nodes onto a stack. Pushing a range of nodes includes preparing a linked list containing multiple items and pushing the linked list atomically onto a stack as a single item.

As depicted in FIG. 3A, push range module 103 receives push command 201, array 253, from a thread. Array 352 includes five data values, data values 352A-352N (wherein N=5). Pushing a range of nodes onto a stack includes iterating over the items in array 352. From the iteration, push range module 103 can determine the total number of nodes to be added to linked list 108 (in this example, 5), create a node for each data value in array 352, and link the created nodes together in a linked list.

As depicted, push range 308 represents a linked list of nodes 311A, 311B, . . . , 311N, created for data values 352A-352N. Node 311A includes data value field 312A storing data value 352A, next pointer field 314A storing next pointer value 316A pointing to node 311B, and index field 317A stores index value 318A. Similarly, node 311B includes data value field 312B storing data value 352B, next pointer field 314B storing next pointer value 316B pointing to node 311C, and index field 317A stores index value 318B. Nodes 311C and 311D represented by the vertical ellipsis can include similar fields and appropriate values for linking from node 311B to node 311N. Likewise, node 311N includes data value field 312N storing data value 352N, next pointer field 314B storing next pointer value 316N, and index field 317N stores index value 318N.

Each of the invention values fields 317A-317N can be set to a decrementing value, such as, for example, −1 (negative one) during creating of push range 308. Pushing a range of nodes onto a stack can also include reading the current head node of the stack. For example, push range module 103 can utilize head pointer value 121 to access (read) node 131.

Transitioning to FIG. 3B, push range module 103 can set next pointer value 316N to point to node 131 and set index value 318A to 17, the sum of 12 (index value 138, the index value of the current had node) plus 5 (the number of new nodes to be added to linked list 108). Push range module 103 then attempts to set head pointer value 122 to point to node 311A (and make node 311A the new head node of linked list 108). If changing head pointer value 122 is successful, the operations implementing push range command 301 are complete and the resulting configuration of linked list 108 is reflected in FIG. 3B. As depicted, node 311A is the new head node and index value 318A is appropriately set to reflect the count of items in linked list 108.

On the other hand, if changing head pointer value 122 fails, operations for implementing push command 301 are retried. Failure to set head pointer value 122 indicates that another competing thread successfully altered linked list 108 (causing there to be a new head node) prior to push range module 102 completing operations to implement command 201. As such, push range module 102 again reads the (new) head node and updates next pointer value 316N and index value 318A. Push range module 103 then attempts again to set head pointer value 122 to point to node 311A. Any number of retries can occur before push range module 103 successful implements push range command 301. Thus, is may be that one or more other nodes are pushed onto linked list 108 prior to successfully pushing push range 308 onto linked list 108.

Figure 4A:
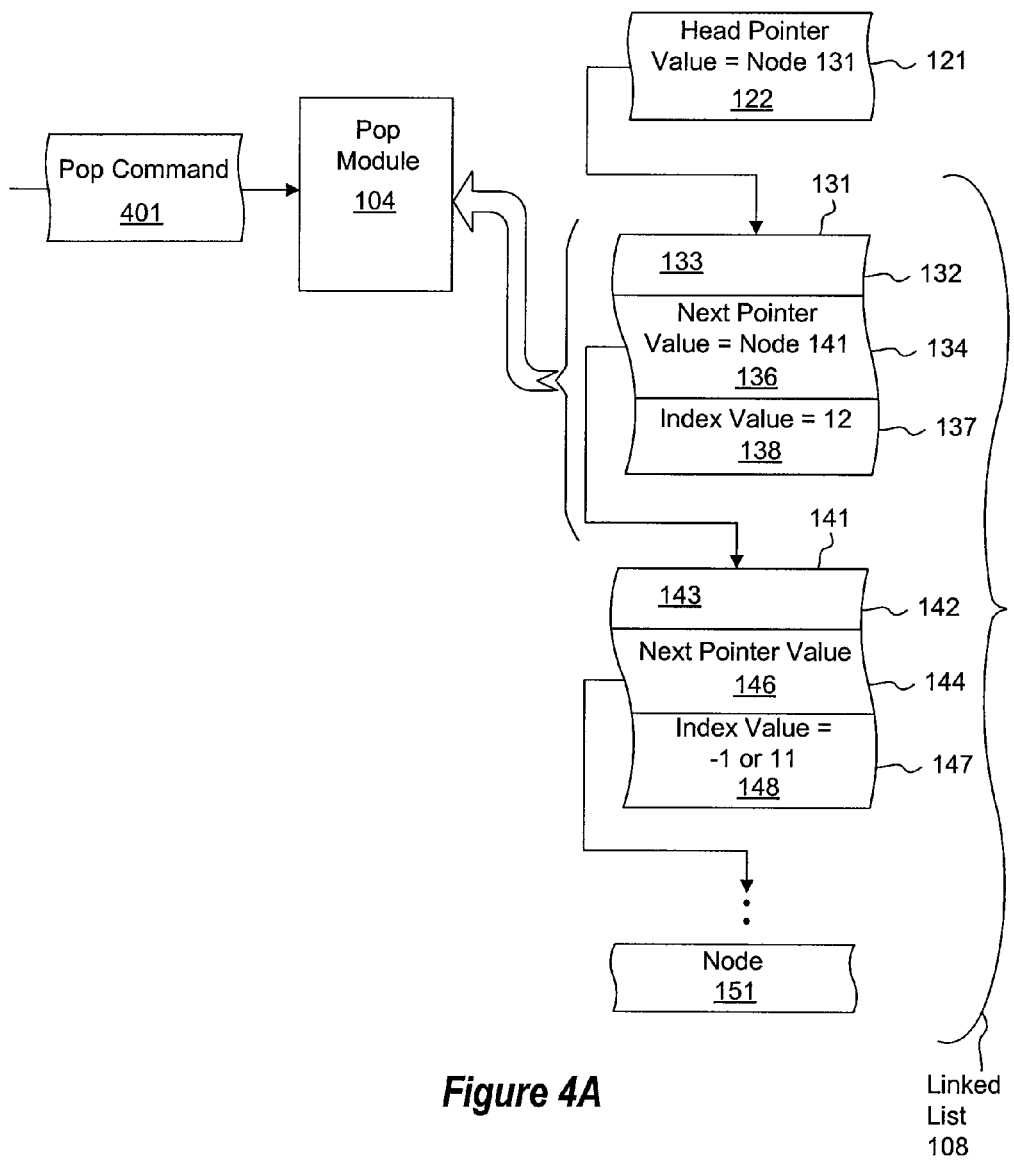
FIGS. 4A and 4B illustrate components and data that facilitate maintaining a count for lock-free stack access when popping a node from a stack.
Figure 4B:
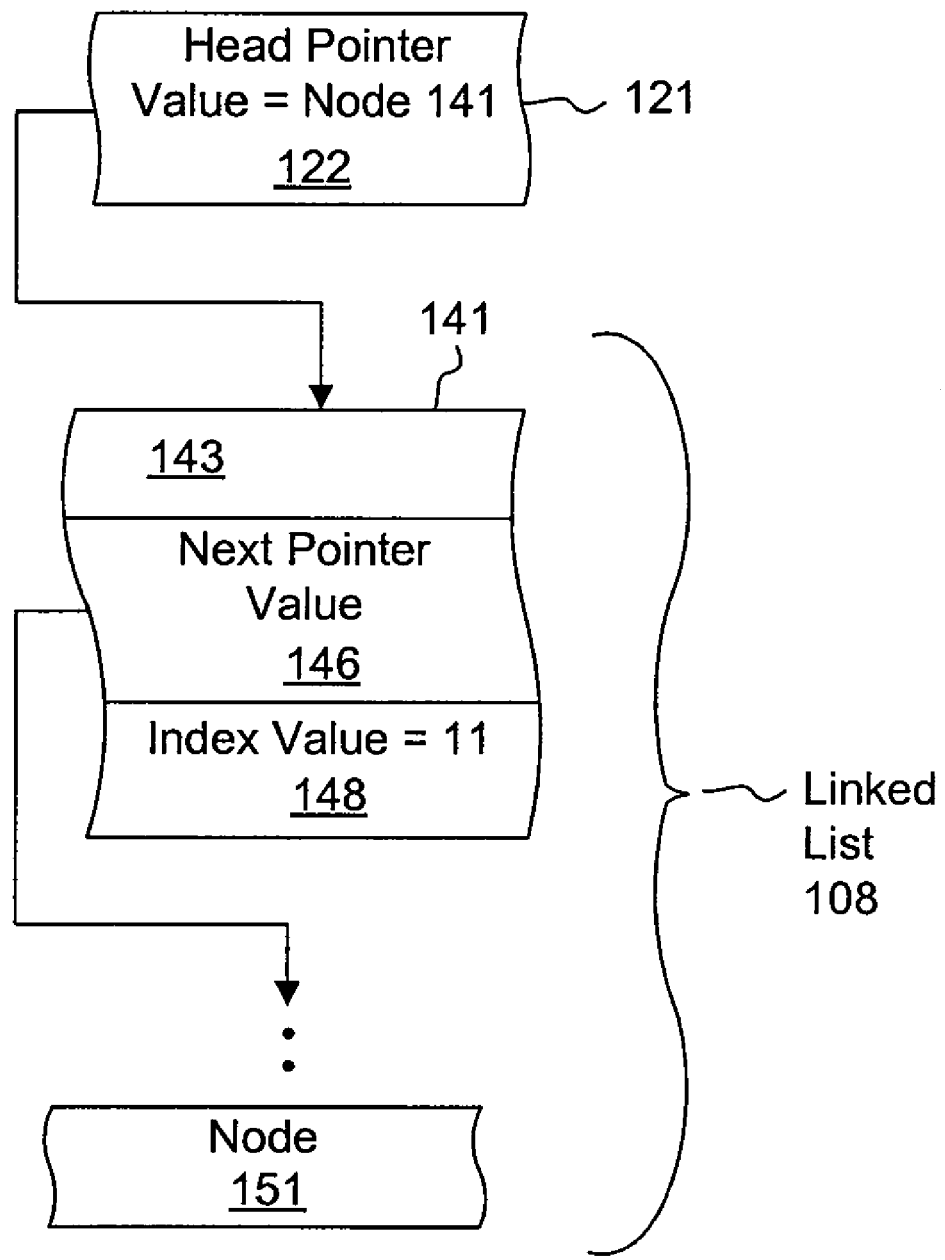

FIGS. 4A and 4B illustrate components and data that facilitate maintaining a count for lock-free stack access when popping a node from a stack. As depicted in FIG. 4A, pop module 104 receives pop command 401 from an executing thread. Popping a node from a stack can include accessing the head node of the stack. For example, in response to receiving pop command 401, pop module 104 uses head pointer value 122 to access node 131. Pop module 104 then accesses index value 138=12 from index field 137. Pop module 104 then uses next pointer value 136=Node 141 to access node 141.

Depending on previous push and pop operations performed on linked list 108, index value 148 can be either a number indicative of the total count of linked list 108 or a number representing a decrementing value. For example, if node 131 was ever the head node of linked list 108, either because it was added singly, it was the first node in a range of nodes, or because it was the next node closest to the head node when the head node was popped off, index value 148 may equal 11. On the other hand, if node 131 was added as an intermediate or last node in a range of nodes (e.g., was added in a range along with node 131) and has never been the head node, index value 148 may equal −1.

Transitioning to FIG. 4B, pop module 104 ensures that index value 148 is correct. When index value 148 is a number indicative of the total count of linked list 108 (e.g., 11), the index value 148 is retained. On the other hand, when index value 148 is a decrementing value, index value 138 (12) is combined with index value 148 (−1) to set a new index value 148 (11).

Pop module 104 then attempts again to set head pointer value 122 to point to node 141. If changing head pointer value 122 is successful, node 131 is popped off of linked list 108 and the operations implementing pop command 401 are complete. The resulting configuration of linked list 108 after initial successful completion of pop command 401 is reflected in FIG. 4B.

On the other hand, if changing head pointer value 122 fails, operations for implementing pop command 401 are retried. Failure to set head pointer value 122 indicates that another competing thread successfully altered linked list 108 (causing there to be a new head node) prior to pop module 104 completing operations to implement pop command 401. As such, pop module 104 again reads the (new) head node, and, if appropriate (e.g., when the value is a decrementing value), updates the index value of the next lower node. Pop module 104 then attempts to set head pointer value 122 to the next lower node (to thereby make the next lower node the new head node). Any number of retries can occur before pop module 104 successful implements pop command 401. Thus, it may be that after one or more retries of pop command 401, a node other than node 131 is eventually popped from linked list 108.

Figure 5A:
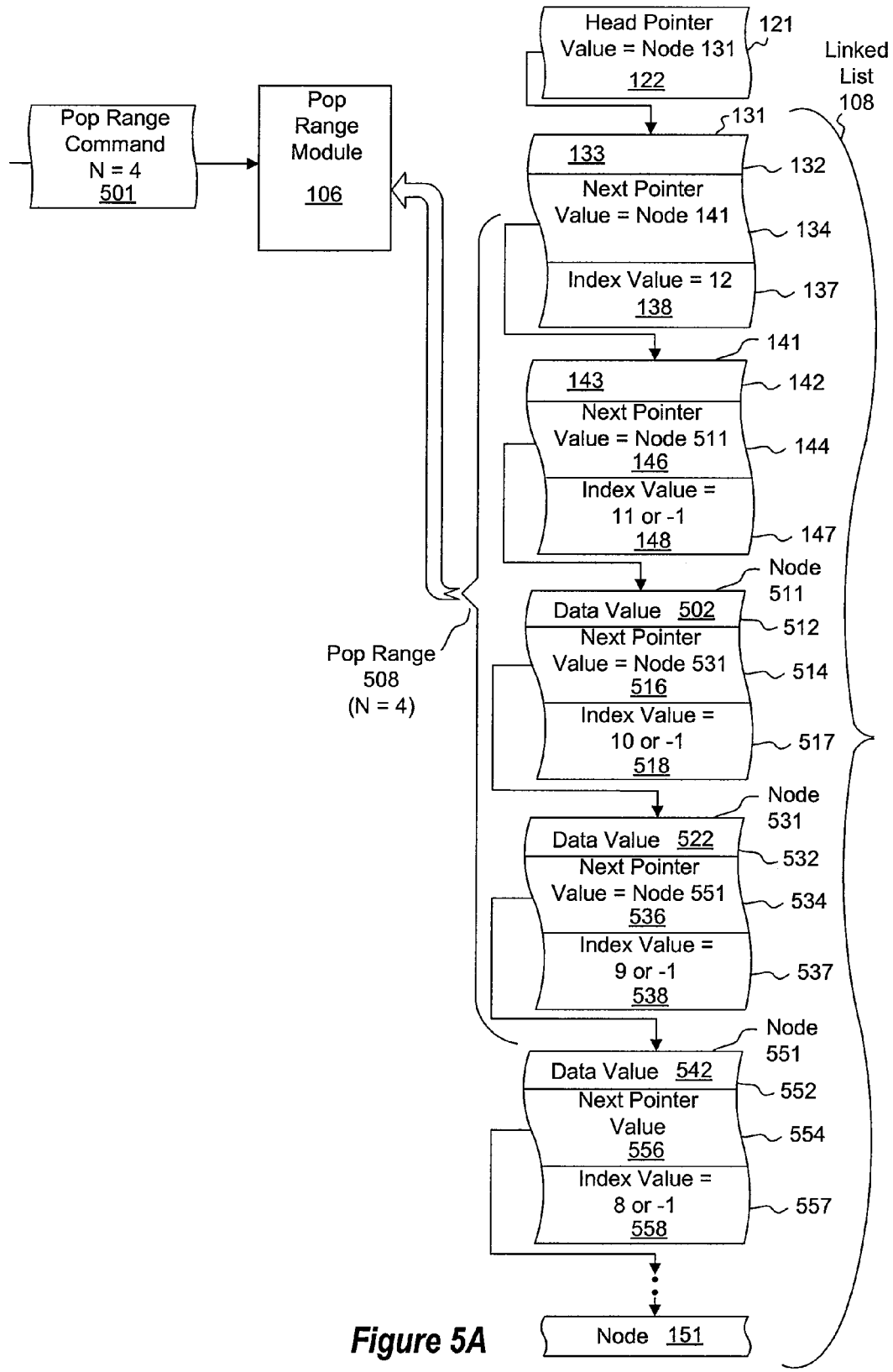
FIGS. 5A and 5B illustrate components and data that facilitate maintaining a count for lock-free stack access when popping a range of nodes from a stack.
Figure 5B:
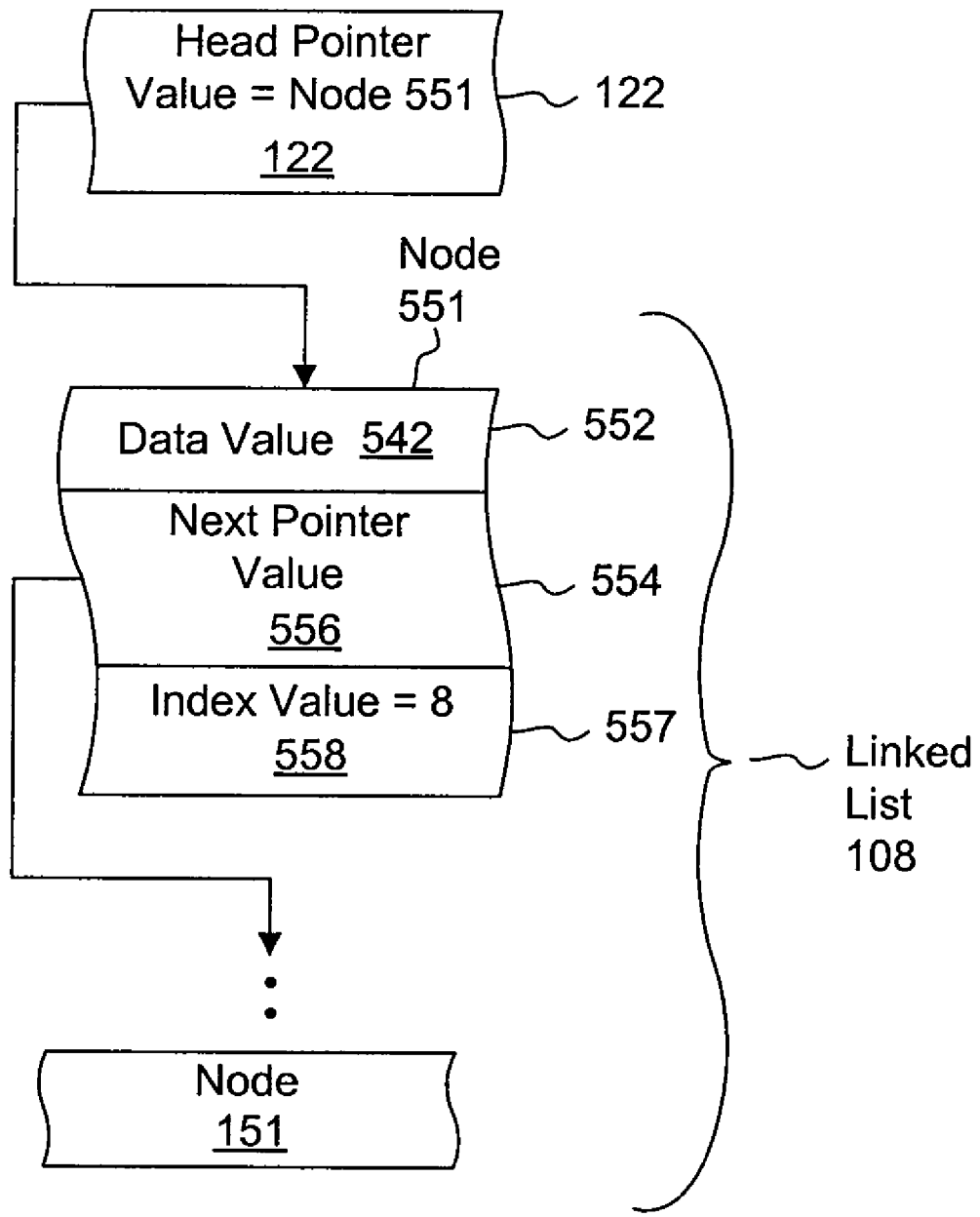

FIGS. 5A and 5B illustrate components and data that facilitate maintaining a count for lock-free stack access when popping a range of nodes from a stack. As depicted in FIG. 5A, nodes 511, 531, and 551 were at some point pushed onto linked list 108 between node 141 and node 151. Node 511 includes data value field 512 storing data value 502, next pointer field 514 storing next pointer value 516 pointing to node 531, and index field 517 stores index value 518. Similarly, node 531 includes data value field 532 storing data value 522, next pointer field 534 storing next pointer value 536 pointing to node 551, and index field 537 stores index value 538. Likewise, node 551 includes data value field 552 storing data value 542, next pointer field 554 storing next pointer value 556 pointing to the node below node 551 in linked list 108, and index field 557 stores index value 558.

Pop range module 106 receives pop range command 501 from an executing thread. Pop range command 501 indicates that a range of four (4) nodes is to be popped off of linked list 108. Popping a range of nodes from a stack can include accessing the head node of the stack. For example, in response to receiving pop range command 501, pop range module 106 uses head pointer value 122 to access node 131. Pop module 104 then accesses index value 138=12 from index field 137.

For each node in the range of nodes, pop range module 106 uses the next node pointer to access an index value form the index field of the next node in linked list 108. Pop range module 106 determines if the index value is a numeric value representative of the total count of nodes in linked list 108 or if the index value is a decrementing value. If the number is representative of the total count of nodes, the index value is retained. If the number is a decrementing value, the index value of the node is combined with decrementing value of the next node to set a new index value for the next node.

For example, pop range module 106 can use next pointer value 136=node 141 to access node 141. Pop range module 106 can access indeed value 148 and determine if index value 148 representative of the total count of nodes in linked list 108 (e.g., 11) or if the index value is a decrementing value (e.g., −1). If index value 148 is a number representative of the total count of linked list 108 (e.g., 11), the index value 148 is retained. On the other hand, if index value 148 is a decrementing value, index value 138 (12) is combined with index value 148 (−1) to set a new index value 148 (11).

With index value 148 now set to 11 (a number representative of the total count of linked list 108), the same operations are performed between nodes 141 and 511 to insure that (if not already set) index value 518 is set to 10. Then index value 538 is set to 9 and index value 558 set to 8 in the same manner. As such, it is ensured that node 551 (which is to be the new head node) is configured with a numeric value representative of the total count of linked list 108 (as a opposed to a decrementing value).

Pop range module 106 then attempts again to set head pointer value 122 to point to node 551. If changing head pointer value 122 is successful, nodes 131, 141, 511, and 531 are popped off of linked list 108 and the operations implementing pop range command 501 are complete. The resulting configuration of linked list 108 after initial successful completion of pop range command 501 is reflected in FIG. 5B.

On the other hand, if changing head pointer value 122 fails, operations for implementing pop range command 501 are retried. Failure to set head pointer value 122 indicates that another competing thread successfully altered linked list 108 (causing there to be a new head node) prior to pop range module 106 completing operations to implement pop rage command 501. As such, pop range module 106 again reads the (new) head node, updates the index value of a range of appropriate lower nodes, and attempts to set head pointer value 122 to the next node lower than the last node in the range of nodes (to thereby make the next lower node the new head node). Any number of retries can occur before pop module 106 successful implements pop range command 501. Thus, it may be that after one or more retries of pop range command 501, a range of four nodes are eventually popped from linked list 108. The range of four nodes may include none, one, or some of nodes 131, 141, 511, and 53, depending on other intervening stack operations.

Embodiments of the invention can also be used to implement a concurrent stack that can be safely accessed by multiple threads (e.g., concurrently executing threads 107), without corrupting stack data.

Accordingly, embodiments of the invention facilitate maintaining a count for lock-free access to linked list. A numeric value representative of the total count of nodes in a linked list is maintained at the head node for the linked list. Commands for pushing and popping nodes appropriately update the total count at a new head node when nodes are added to and removed from the linked list. Thus, determining the count of nodes in a linked list is an order 1 (or O(1)) operation, and remains constant even when the size of linked list changes The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer implemented method for maintaining a count of nodes in a stack in a lock free manner, the stack represented by a linked list of nodes, each node including a data field, a next pointer field, and an index field, the data field storing a data value, the next pointer field storing a next pointer value, the next point value pointing to the next node following the node in the stack, the index field storing an index value used to calculate how many other nodes exist on the stack prior to the node, the method being implemented by a computer system having at least one processor and system memory, the stack being accessible by a plurality of concurrently executing threads running at the computer system, the method comprising:

an act of receiving an indication from one of the concurrently executing threads that a first node is to be added to the stack;

an act of using a head pointer to access a current head node of the stack, the head pointer pointing to the current head node;

an act of accessing an index value from an index value field of the current head node, the index value being an numeric value representative of the current number of nodes linked within the stack;

an act of generating an updated index value for the first node based on the index value of the current head node and subsequent to accessing the index value;

an act of storing the updated index value in an index field of the first node, the updated index value being a numeric value representative of the current number of nodes linked within the stack including the first node;

an act of updating the head pointer to point to the first node, updating the head pointer making the first node the head node for the stack such that the number of nodes linked within the stack remains accessible via the head pointer.

2. The method as recited in claim 1, further comprising an act of storing a pointer from the first node to the current head node within a next pointer field in the first node.

3. The method as recite in claim 1, further comprising prior to updating the head pointer to point to the first node:

an act of attempting to update the head pointer to point to the first node; and an act of failing the attempt to update the head pointer to point to the first node, failure indicative of another of the concurrently executing threads altering the arrangement of the stack after the head node was accessed.

4. The method as recited in claim 1, wherein the act of receiving an indication from one of the concurrently executing threads that a first node is to be added to the stack comprises an act of receiving an indication that a range of new nodes is to be pushed onto the stack, the range of nodes including at least the first node and at least one other node including a last node.

5. The method as recited in claim 4, wherein the act of generating an updated index value for the first node based on the index value and subsequent to accessing the index value comprises:

an act of determining the number of nodes included in the range of nodes; and an act of adding the accessed index value to the determined number of nodes to calculate the updated index value.

6. The method as recited in claim 5, further comprising an act of setting the index value for the at least one other node in the range of nodes to a decrementing value, the decrementing value indicating a total count of nodes in the stack relative to an index value set for another node above the at least one other node in the stack.

7. The method as recited in claim 5, further comprising an act of storing a pointer from the last node to the current head node within a next pointer field in the last node.

8. A computer implemented method for maintaining a count of a number of nodes linked within a linked list in a lock free manner when a range of nodes is collectively removed from a stack, the stack represented by a linked list of nodes, each node including a data field, a next pointer field, and an index field, the data field storing a data value, the next pointer field storing a next pointer value, the next point value pointing to the next node following the node in the stack, the index field storing an index value used to calculate how many nodes remain on the stack after the range of nodes is collectively removed, the method being implemented by a computer system having at least one processor and system memory, the stack being accessible by a plurality of concurrently executing threads running at the computer system, the method comprising:

an act of receiving an indication from one of the concurrently executing threads that a range of nodes is to be collectively popped off of the linked list representing a stack, the range of nodes including at least a head node of the linked list and at least one other node of the linked list, including a last node in the range of nodes;

an act of using a head pointer to access the head node of the linked list;

starting with the head node:
    an act of accessing an index value from an index value field of the head node, the index value being an numeric value representative of the total count of nodes in the linked list;
    an act of using the next node pointer of the node to access an index value from the index value field of the next node in the linked list;
    an act of determining the index value of the next node is a relative numeric value representing how to calculate the total count of nodes in the linked list; and
    when the index value in the index value field of the next node is a relative numeric value:
        an act of calculating an updated index value for the next node based on the index value for the node and the relative numeric value, the updated index value being a numeric value representative of the total count of nodes in the linked list; and
        an act of setting the index field for the next node to have the updated index value;
    an act of making the head pointer equivalent to the next node pointer in the last node such that the head pointer points to the node that is to be the head node of the linked list after the range of nodes is popped off of the linked list; and
    an act of popping the range of nodes off of the linked list.

9. The method as recite in claim 8, further comprising prior to making the head pointer equivalent to the next node pointer in the last node:
    an act of attempting making the head pointer equivalent to the next node pointer in the last node; and
    an act of failing the attempt to make the head pointer equivalent to the next node pointer in the last node, failure indicative of another of the concurrently executing threads altering the arrangement of the data structure after the head node was accessed.

10. A computer system, the computer system comprising:
one or more processors;
system memory; and
one or more computer storage media having stored thereon computer-executable instructions representing a push module, a push range module, a pop module, and a pop range module, wherein the push module, the push range module, the pop module, and the pop range module maintain the count of nodes in a stack in a lock free manner, the stack represented by a linked list of nodes, each node including a data field, a next pointer field, and an index field, the data field storing a data value, the next pointer field storing a next pointer value, the next point value pointing to the next node following the node in the stack, the index field storing an index value used to calculate how many other nodes where pushed onto the stack prior to the node, wherein the push module is configured to:
receive an indication that a new node is to be pushed onto the stack;
use a head pointer value to access the index value stored in the index field of a head node of the stack;
increment the index value to generate an updated index value;
store the updated index value in the index value field of the new node;
set the next pointer value in the next pointer field of the new node equal to the value of the head pointer value such that the pointer value for the new node points to the head node; and
update the head pointer value to point to the new node subsequent to updating the next pointer field of the new node to make the new node the head node;

wherein the push range module is configured to:
receive an indication that a range of new nodes is to be pushed onto the stack, the range of new nodes including at least a first node and at least one other node including a last node;
determine the number of nodes included in the range of new nodes;
set the index value for the each of the at least one other nodes including the last node to a decrementing value;
use a head pointer value to access the index value stored in the index field of a head node of the stack;
add the accessed index value to the determined number of nodes to calculate an updated index value;
store the updated index value in the index value field of the first node;
set the next pointer value in the next pointer field of the last node equal to the head pointer value such that the next pointer value for the last node points to the head node; and
update the head pointer value to point to the first node to make the first node the new head node subsequent to updating the next pointer field of the last node;

wherein the pop module is configured to:
receive an indication that a node is to be popped off of the stack;
use a head pointer value to access the index value stored in the index field of the head node of the stack;
use the next pointer value in the next pointer field of the head node to access the next node following the head node in the stack;
ensure that the index value stored in the index field of the next node below the head node equals the index value stored in the index field of head node minus one;
set the head pointer value equal to the next pointer value in the next pointer field of the head node to make the next node the new head node; and
pop the head node off of the stack; and wherein the pop range module is configured to:
receive an indication that a range nodes is to be collectively popped off of the stack, the range of nodes including at least a head node of the linked list and at least one other node including a last node;
use a head pointer value to access an index value from an index value field of the head node;
use a next pointer value in the next pointer field of the last node to access the node in the stack that follows the last node in the range of nodes;
use the index values stored in the index value field for each node in the range of nodes to ensure that the index value stored in the index field of the node following the last node is a numeric value representing how many other nodes where pushed onto the stack prior to the node following the last node;
make the head pointer value equivalent to the next pointer value in the last node such that the head pointer value points to the node following the last node thereby making the node following the last node the new head node; and
pop the range of nodes off of the stack.

11. The system as recited in claim 10, wherein the system further comprises a plurality of concurrently executing tasks that can submit commands for altering the configuration of the stack.

12. The system as recited in claim 10, wherein the pop module being configured to ensure that the index value stored in the index field of the next node following the head node equals the index value stored in the index field of head node minus one comprises the pop module being configured to:

an act of calculating an updated index value for the next node based on the index value for the node and a relative numeric value stored in the index field for the next node, the updated index value being a numeric value representative of the total count of nodes in the linked list; and an act of setting the index field for the next node to have the updated index value so as to overwrite the relative numeric value.

13. The system as recited in claim 10, wherein the push range module being configured to set the index value for the each of the at least one other nodes including the last node to a decrementing value comprises the push range module being configured to set the index value for the each of the at least one other nodes including the last node to negative one.

* * * * *